(12) United States Patent
Otokita

(10) Patent No.: US 7,292,356 B2
(45) Date of Patent: Nov. 6, 2007

(54) PRINTING WITH REDUCED OUTLINE BLEEDING

(75) Inventor: Kenji Otokita, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1050 days.

(21) Appl. No.: 10/327,678

(22) Filed: Dec. 24, 2002

(65) Prior Publication Data

US 2003/0147091 A1    Aug. 7, 2003

(30) Foreign Application Priority Data

Dec. 25, 2001 (JP) .............................. 2001-392494

(51) Int. Cl.
G06F 15/00 (2006.01)
(52) U.S. Cl. ........................ 358/1.13; 358/1.9; 358/2.1; 358/327; 382/258; 382/266; 347/10
(58) Field of Classification Search ............... 358/1.13, 358/1.9, 2.1, 3.27; 382/258, 266; 347/10
See application file for complete search history.

(56) References Cited

U.S. PATENT DOCUMENTS

| | | | | |
|---|---|---|---|---|
| 5,907,332 A | * | 5/1999 | Fujita et al. ................... | 347/15 |
| 6,290,330 B1 | * | 9/2001 | Torpey et al. ................. | 347/43 |
| 6,361,144 B1 | * | 3/2002 | Torpey et al. ................. | 347/43 |
| 6,416,150 B1 | * | 7/2002 | Kimura ........................ | 347/14 |
| 6,445,463 B1 | * | 9/2002 | Klassen ....................... | 358/1.9 |
| 6,753,976 B1 | * | 6/2004 | Torpey et al. ................ | 358/1.9 |

FOREIGN PATENT DOCUMENTS

| | | |
|---|---|---|
| EP | 0 390 473 A2 | 10/1990 |
| EP | 0 997 840 A2 | 5/2000 |
| EP | 1 191 784 A1 | 3/2002 |
| JP | 10-250119 A | 9/1998 |
| JP | 2001-199088 A | 7/2001 |

\* cited by examiner

*Primary Examiner*—Twyler Lamb
*Assistant Examiner*—Mark R. Milia
(74) *Attorney, Agent, or Firm*—Sughrue Mion Pllc.

(57) ABSTRACT

The present invention is a printing method of recording an image by forming ink dots on a print medium in one of a plurality of print modes. The method determines the reduction pattern in response to the selected print mode selected from the plurality of print modes, which represents reduction of the ink amount for forming ink dots on a border area of a specific type image area represented by the dot data.

45 Claims, 16 Drawing Sheets

Variable Dot-forming method
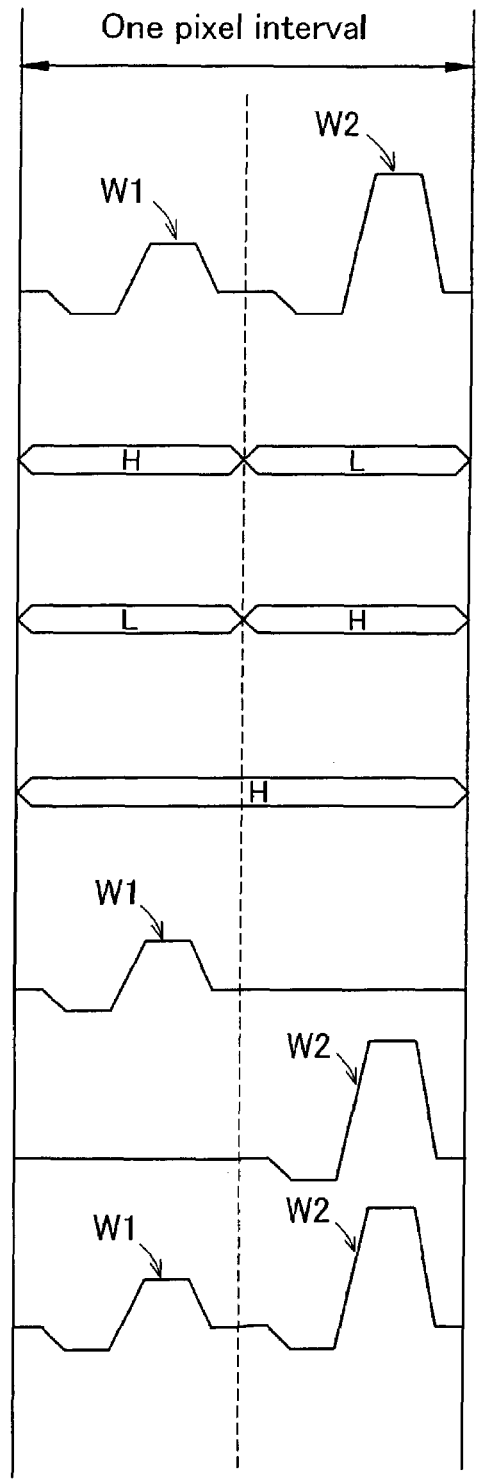
Fig.5A ORGDRV
Fig.5B PRT(i) (For a small dot)
Fig.5C PRT(i) (For a medium dot)
Fig.5D PRT(i) (For a large dot)
Fig.5E DRV(i) (For a small dot)
Fig.5F DRV(i) (For a medium dot)
Fig.5G DRV(i) (For a large dot)

Fig.9

Relation between print mode and skip pattern

| Print medium | Resolution (Main scan × Sub-scan) | Skip pattern |
|---|---|---|
| Plain paper | 360dpi × 360dpi | Nvd |
| | 1440dpi × 360dpi | Fvd |
| | 2880dpi × 1440dpi | Uvd |
| Special paper | No skipping | |

Other printing environments
    Dot-forming method : Variable shot
    Type of ink         : Dye ink Fig.10A
Nvd Fig.10B
Fvd Fig.10C
Uvd $$\Delta x = \begin{pmatrix} -1 & 0 & 1 \\ -k & 0 & k \\ -1 & 0 & 1 \end{pmatrix}$$

$$\Delta y = \begin{pmatrix} -1 & -k & -1 \\ 0 & 0 & 0 \\ 1 & k & 1 \end{pmatrix}$$

Fig.12

The second embodiment

| Print medium | Resolution (Main scan × Sub-scan) | Dot-forming method | Skip pattern |
|---|---|---|---|
| Plain paper | 360dpi × 360dpi | Variable shot | Nvd |
| | | Multi-shot | Nmd |
| | 1440dpi × 360dpi | Variable shot | Fvd |
| | | Multi-shot | Fmd |
| | 2880dpi × 1440dpi | Variable shot | Uvd |
| | | Multi-shot | Umd |
| Special paper | No skipping | | |

Another printing environments
    Type of ink: Dye ink

Fig.13A  Nmd
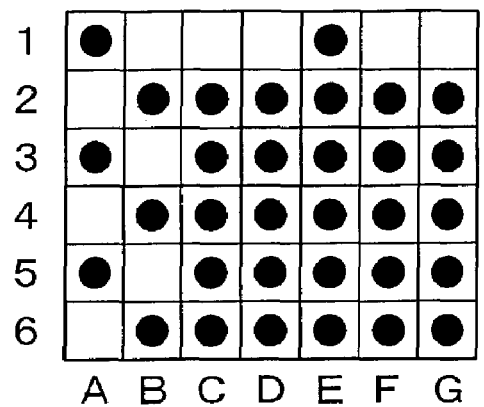
Fig.13B  Fmd
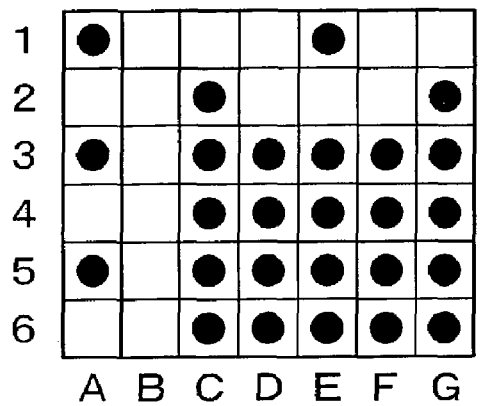
Fig.13C  Umd
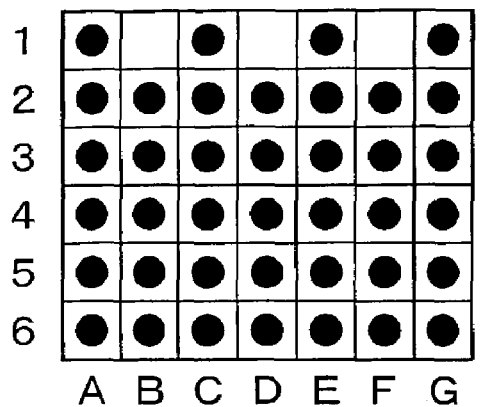

Muti-shot Dot-forming method
Fig.14A  ORGDRV 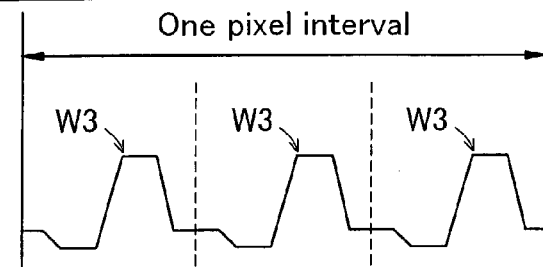
Fig.14B  PRT(i) (For a small dot) 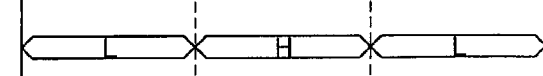
Fig.14C  PRT(i) (For a medium dot) 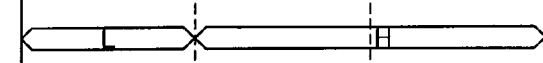
Fig.14D  PRT(i) (For a large dot) 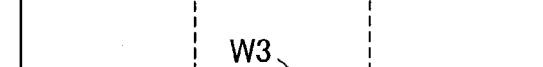
Fig.14E  DRV(i) (For a small dot) 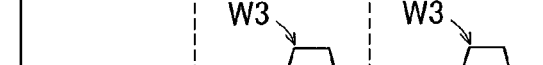
Fig.14F  DRV(i) (For a medium dot) 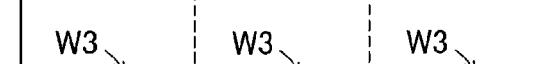
Fig.14G  DRV(i) (For a large dot) 

Fig.15

The third embodiment

| Print medium | Type of ink | Resolution (Main scan × Sub-scan) | Dot-forming method | Skip pattern |
|---|---|---|---|---|
| Plain paper | Dye ink | 360dpi × 360dpi | Variable shot | Nvd |
| | | | Multi-shot | Nmd |
| | | 1440dpi × 360dpi | Variable shot | Fvd |
| | | | Multi-shot | Fmd |
| | | 2880dpi × 1440dpi | Variable shot | Uvd |
| | | | Multi-shot | Umd |
| | Pigment ink | 360dpi × 360dpi | Variable shot | Nvp |
| | | | Multi-shot | Nmp |
| | | 1440dpi × 360dpi | Variable shot | Fvp |
| | | | Multi-shot | Fmp |
| Special paper | No skipping | | | |

Fig.16A
Nvp

Fig.16C
Nmp

Fig.16B
Fvp

Fig.16D
Fmp

PRINTING WITH REDUCED OUTLINE BLEEDING

BACKGROUND OF THE INVENTION

1. Field of the Invention

The present invention relates to a technique for printing images on a print medium by ink ejection.

2. Description of the Related Art

Ink-jet printers are widely used as devices for outputting images created by computers and digital cameras.

When text or line drawings such as illustrations are printed using an ink-jet printer, ink bleed sometimes occurs at the borders of the line drawing. Ink bleed occurs when ink ejected onto the line drawing area is not absorbed into the print medium but rather forms a pool of ink, resulting in outflow towards areas where no ink dots have been formed.

However, the extent of ink bleed depends on print resolution and other printing parameters. For example, where different resolutions are used in the main scan direction and sub-scan direction, pools of ink will tend to form in border lines parallel to the direction of higher resolution.

SUMMARY OF THE INVENTION

Accordingly, an object of the present invention is to reduce ink bleeding in borders in a variety of printing environments occurring in printing devices that print images by ejecting ink drops.

In order to attain the above and the other objects of the present invention, there is provided a method of recording an image by forming ink dots on a print medium in one of a plurality of print modes. The method comprises the steps of: generating dot data from image data indicative of the image, the dot data representing a state of dot formation at each pixel on the print medium; determining a reduction pattern in response to a print mode selected from the plurality of print modes, the reduction pattern representing reduction of an amount of ink for forming an ink dot on a border area of a specific type image area represented by the dot data, the specific type image area being composed of pixels at which specific type dots are to be formed; adjusting the dot data so as to reduce the amount of ink for forming the ink dots based on the selected reduction pattern; and recording the image on the print medium by forming the ink dots in response to the adjusted dot data.

In the present invention, a method of reducing the amount of ink of ink drops in the borders of a specific image area composed of pixels formed by a specific type of ink dots is determined in response to the selected printing mode, whereby it is possible to reduce the amount of ink in the borders of a printed image using a method suited to a particular printing environment. As a result, an appropriate ink amount reduction process that largely avoids bleeding and white spaces can be performed with reference to printing environment, allowing crisp borders to be produced.

The present invention can be realized in various forms such as a method and apparatus for printing, a method and apparatus for producing print data for a printing unit, and a computer program product implementing the above scheme.

These and other objects, features, aspects, and advantages of the present invention will become more apparent from the following detailed description of the preferred embodiments with the accompanying drawings.

BRIEF DESCRIPTION OF THE DRAWINGS

FIGS. 5A-5G illustrate a method by which the head drive circuit 52 generates a drive signal DRV;

FIG. 9 illustrates relation between print mode parameters and selected skip pattern in the first embodiment of the present invention;

FIGS. 10A-10C illustrate relation between print mode parameters and skip pattern in the first embodiment of the present invention;

FIG. 12 illustrates relation between print mode parameters and selected skip pattern in the second embodiment of the present invention;

FIGS. 13A-13C illustrate relation between print mode parameters and skip pattern in the second embodiment of the present invention;

FIGS. 14A-14H illustrate a method for generating a drive signal DRV used by the head drive circuit 52 to form dots in multi-shot format in the second embodiment;

FIG. 15 illustrates relation of print mode parameters and selected skip pattern in the third embodiment of the present invention; and FIGS. 16A-16D illustrate relation of print mode parameters and selected skip pattern in the third embodiment of the present invention.

DESCRIPTION OF THE PREFERRED EMBODIMENT

The present invention is explained in the following sequence based on the embodiments.
A. Apparatus Structure:
B. The first embodiment:
C. The second embodiment:
D. The third embodiment:
E. Modifications:

A. Apparatus Structure

Figure 1:
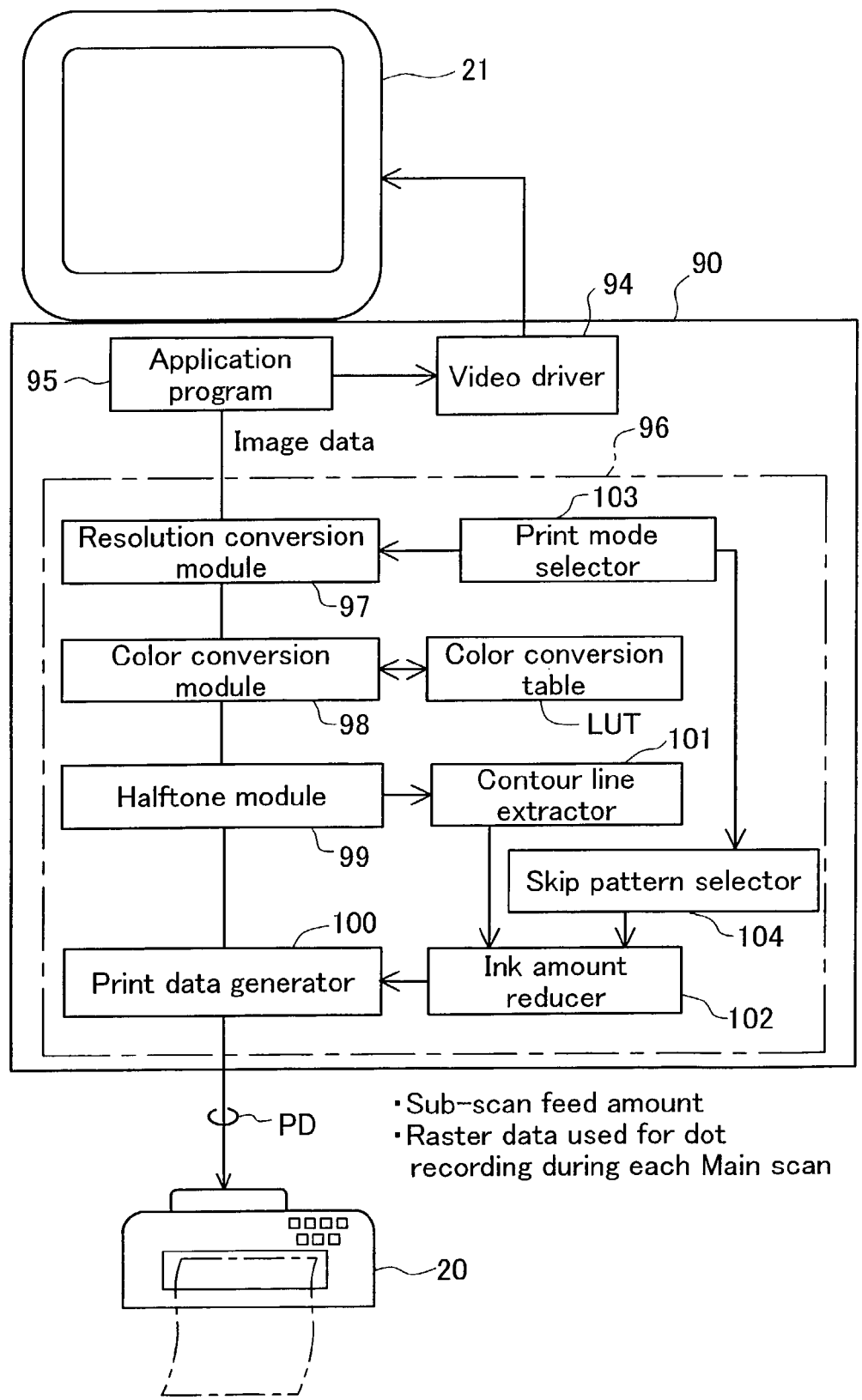
FIG. 1 is a block diagram depicting the structure of a print system configured according to the embodiment of the present invention.

FIG. 1 is a block diagram depicting the structure of a print system configured according to the embodiment of the present invention. The print system comprises a computer 90 as a print control device, and a color printer 20 as a print unit. A combination of the color printer 20 and computer 90 can be broadly referred to as a printing device.

The computer 90 executes an application program 95 with the aid of a specific operating system. The operating system has a video driver 94 and printer driver 96, and the print data PD to be forwarded to the color printer 20 are output by the application program 95 via these drivers. The application program 95 processes images in the desired manner and displays these images on a CRT 21 via the video driver 94.

When the application program 95 issues a print command, the printer driver 96 of the computer 90 receives image data from the application program 95, and the result is converted to the print data PD to be sent to the color printer 20. In the example shown in FIG. 1, the printer driver 96 comprises a resolution conversion module 97, a color conversion module 98, halftone module 99, a print data generator 100, a contour line extractor 101, an ink amount reducer 102, a print mode selector 103, a skip pattern selector 104, and a color conversion table LUT. In the present embodiment, the resolution conversion module 97, color conversion module 98, and halftone module 99 constitute the dot data generator in the claims. The skip pattern selector 104 corresponds to reduction pattern determiner in the claims.

The role of the resolution conversion module 97 is to convert the resolution (that is, the number of pixels per unit length) of the color image data handled by the application program 95 to a resolution that can be handled by the printer driver 96. The image data whose resolution has been converted in this manner constitute image information, which is composed of the three colors RGB. The color conversion module 98 converts the RGB image data to multi-tone data to obtain a plurality of ink colors suitable the color printer 20. The conversion is performed for each pixel while the color conversion table LUT is referenced.

The color-converted multi-tone data may, for example, have 256 gray scale values. The halftone module 99 performs a halftone procedure designed to represent these gray scale values with the aid of the color printer 20 by forming dispersed ink dots. The halftone data generated as a result of the halftone procedure are queued in the order of the data to be forwarded to the color printer 20 by the print data generator 100, and are output as final print data PD. The print data PD comprise raster data for specifying the manner in which dots are recorded during each main scan, and data for specifying the amount of feed in the direction of subscan. The functions performed by the contour line extractor 101, the ink amount reducer 102, the print mode selector 103, and skip pattern selector 104 are described below.

The printer driver 96 is a program for executing the functions involved in generating print data PD. The programs for executing the functions of the printer driver 96 are supplied as products stored on computer-readable storage media. Examples of such storage media include flexible disks, CD-ROMs, magneto optical disks, IC cards, ROM cartridges, punch cards, printed matter containing bar codes and other symbols, computer internal storage devices (RAM, ROM, and other types of memory) and external storage devices, and various other types of computer-readable media.

Figure 2:
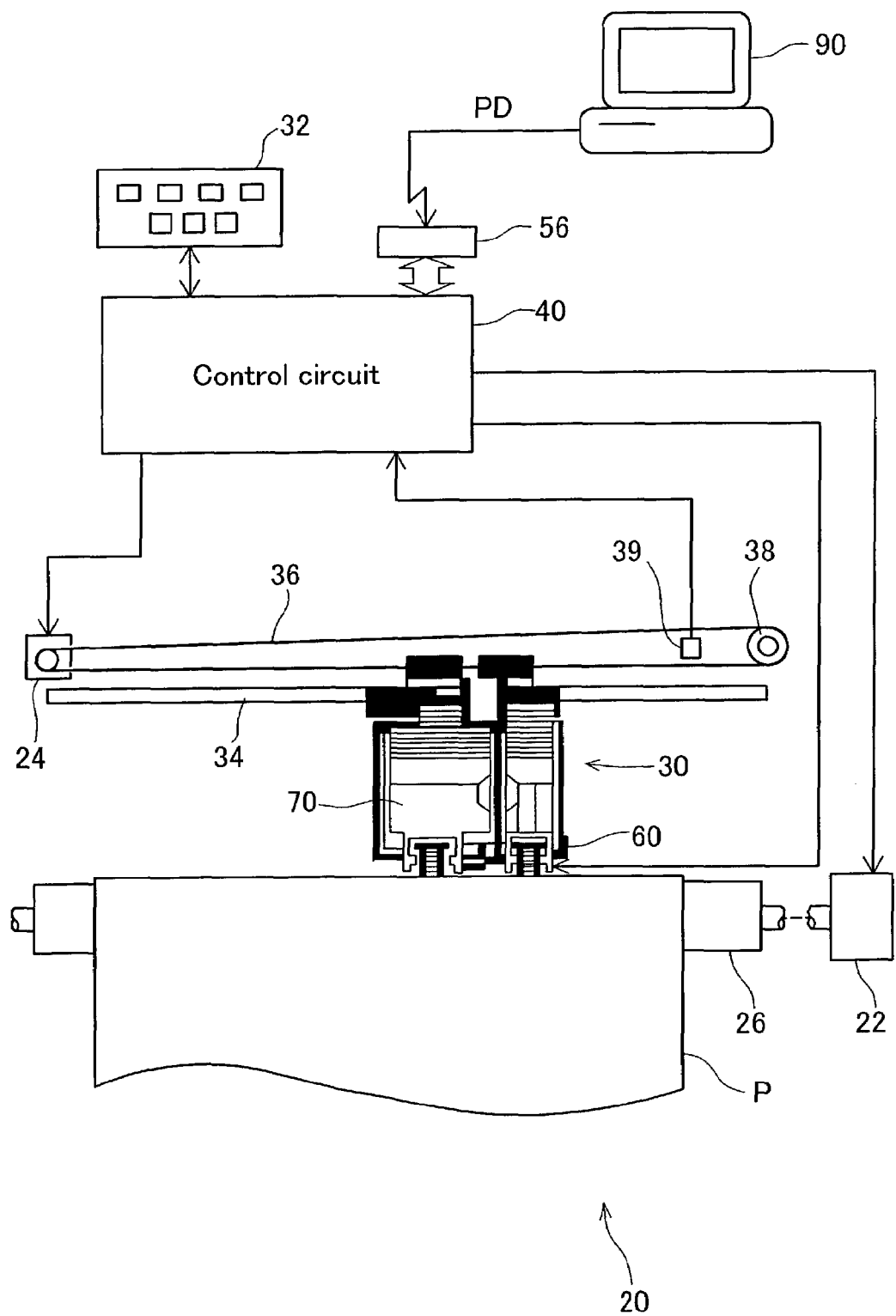
FIG. 2 is a schematic block diagram of the color printer 20.

FIG. 2 is a schematic block diagram of the color printer 20. The color printer 20 comprises a secondary scan/feed mechanism for transporting printing paper P in the direction of sub-scan by means of a paper feed motor 22, a main scan/feed mechanism for reciprocating a carriage 30 in the axial direction (direction of main scan) of a platen 26 by means of a carriage motor 24, a head drive mechanism for ejecting the ink and forming dots by actuating the print head unit 60 (print head assembly) mounted on the carriage 30, and a control circuit 40 for exchanging signals among the paper feed motor 22, the carriage motor 24, the print head unit 60, and a control panel 32. The control circuit 40 is connected by a connector 56 to the computer 90.

The secondary scan/feed mechanism for transporting the printing paper P comprises a gear train (not shown) for transmitting the rotation of the paper feed motor 22 to the platen 26 and a roller (not shown) for transporting the printing paper. The main scan/feed mechanism for reciprocating the carriage 30 comprises a sliding shaft 34 mounted parallel to the axis of the platen 26 and designed to slidably support the carriage 30, a pulley 38 for extending an endless drive belt 36 from the carriage motor 24, and a position sensor 39 for sensing the original position of the carriage 30.

Figure 3:
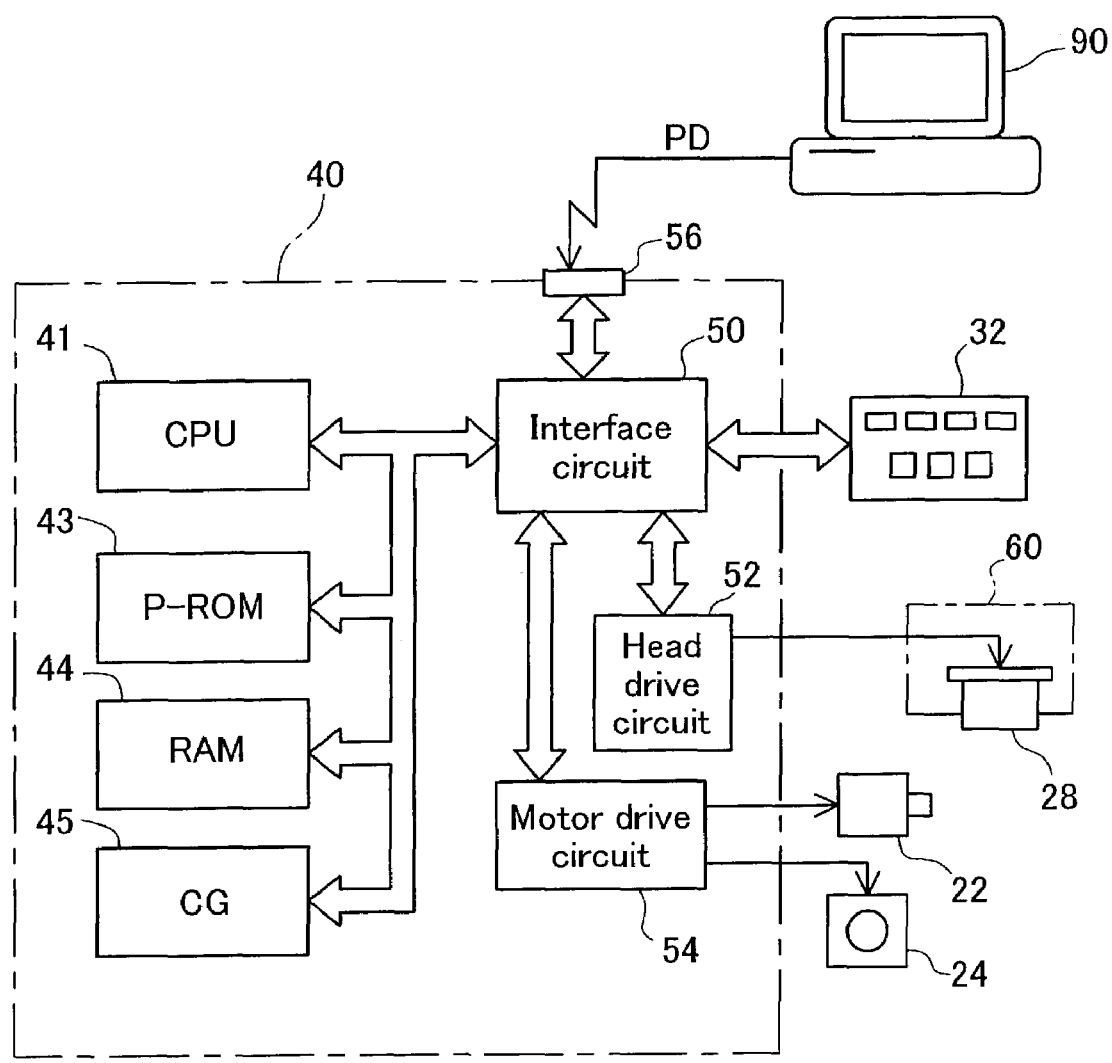
FIG. 3 is a block diagram depicting the structure of a color printer 20 based on the control circuit 40.

FIG. 3 is a block diagram depicting the structure of a color printer 20 based on the control circuit 40. The control circuit 40 is composed as an arithmetic Boolean circuit comprising a CPU 41, a programmable ROM (PROM) 43, a RAM 44, and a character generator (CG) 45 containing dot matrices for characters. The control circuit 40 further comprises a I/F circuit 50 for creating a interface with external motors and other components, a head drive circuit 52 connected to the I/F circuit 50 and designed to eject ink by actuating the print head unit 60, and a motor drive circuit 54 for actuating the paper feed motor 22 and carriage motor 24. The I/F circuit 50 contains a parallel interface circuit and is capable of receiving print data PD from the computer 90 via the connector 56. The color printer 20 prints images in accordance with the print data PD. RAM 44 functions as a buffer memory for the temporary storage of raster data.

The print head unit 60 has a print head 28 and allows ink cartridges to be mounted. The print head unit 60 can be mounted on the color printer 20 and removed there from as a single component. In other words, the print head unit 60 is replaced when the print head 28 needs to be replaced.

Figure 4:
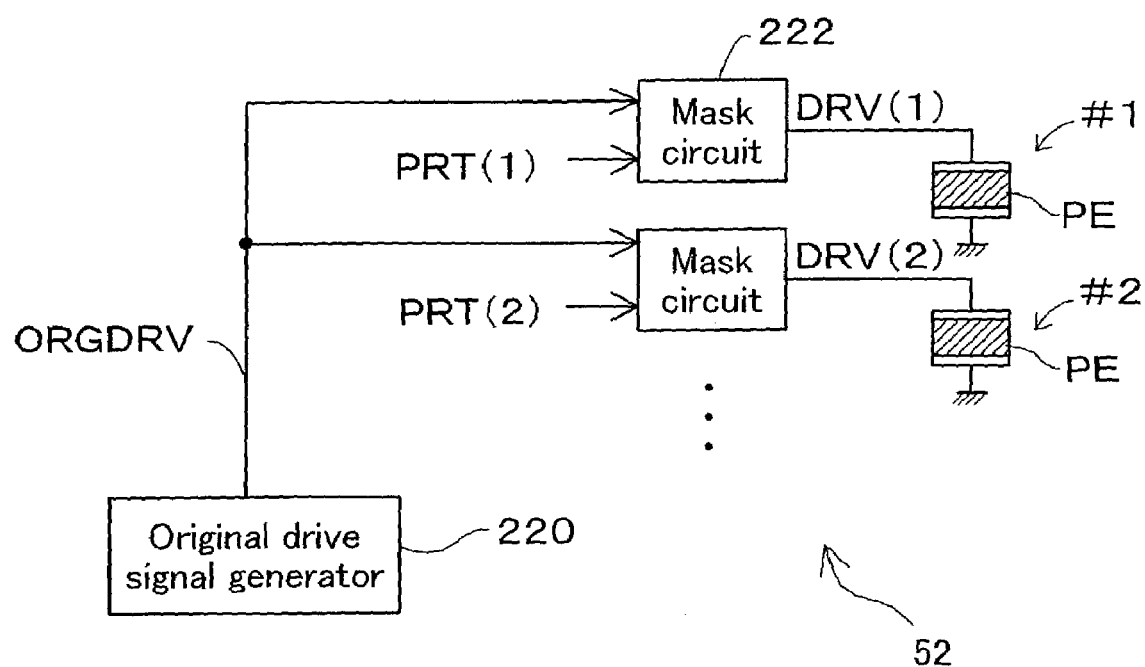
FIG. 4 is a block diagram showing the principle components of the head drive circuit 52.

FIG. 4 is a block diagram showing the principle components of the head drive circuit 52 (FIG. 3). Head drive circuit 52 comprises an original drive signal generator 220, a plurality of mask circuits 222, and piezo elements PE for the nozzles. Mask circuits 222 are provided in correspondence with the nozzles #1, #2 . . . of the print head 28.

FIGS. 5A-5G illustrate a method by which the head drive circuit 52 generates a drive signal DRV. Drive signal DRV is produced by shaping an original drive signal ORGDRV with a serial print signal PRT(i). As shown in FIG. 5A, the original drive signal ORGDRV in the present embodiment contains two types of pulses W1, W2 having different waveforms in two sub-intervals within a single pixel interval. Pulse W1 is smaller than pulse W2.

FIGS. 5B-5D show serial print signals PRT(i) for producing a small dot, a medium dot and a large dot, respectively. In each sub-interval within a single pixel interval, serial print signal PRT (i) assumes either "H" or "L" level. The small dot serial print signal PRT (i) (FIG. 5B) is "H" during the first sub-interval. The medium dot serial print signal PRT (i) (FIG. 5C) is "H" during the second sub-interval. The large dot serial print signal PRT (i) (FIG. 5D) is "H" during all sub-intervals. When a serial print signal is "H", the mask circuit 222 passes the original drive signal ORGDRV to generate a drive signal DRV. While not shown in the drawing, the serial print signal appearing when no dot is to be formed is "L" throughout the entire pixel interval.

FIGS. 5E-5G show drive signals DRV(i). As noted, a drive signal DRV(i) is a signal resulting from the original drive signal ORGDRV being allowed to pass only during the interval that a serial print signal PRT(i) is "H". As a result, the small dot drive signal (FIG. 5E) contains first pulse W1, the medium dot drive signal (FIG. 5F) contains second pulse W2, and the large dot drive signal (FIG. 5G) contains both pulse W1 and pulse W2.

When a drive signal DRV(i) such as those shown in FIGS. 5E-5G is supplied to a piezo element PE (FIG. 4), the piezo element ejects a drop of ink from the nozzle Nz in response to the drive signal DRV(i). More specifically, when the drive signal DRV supplied to the piezo element is a small dot signal containing pulse W1, it ejects a relatively small ink drop IPs, whereas if it is a medium dot signal containing pulse W2, it ejects a relatively large ink drop IPm. When a large dot drive signal DRV containing both pulses W1 and W2 is supplied to a piezo element, two ink drops will coalesce in space or on the print medium to form an even larger dot. This method of forming dots of different size by means of drive signals of different waveforms is herein referred to as "variable shot".

Figure 6A:
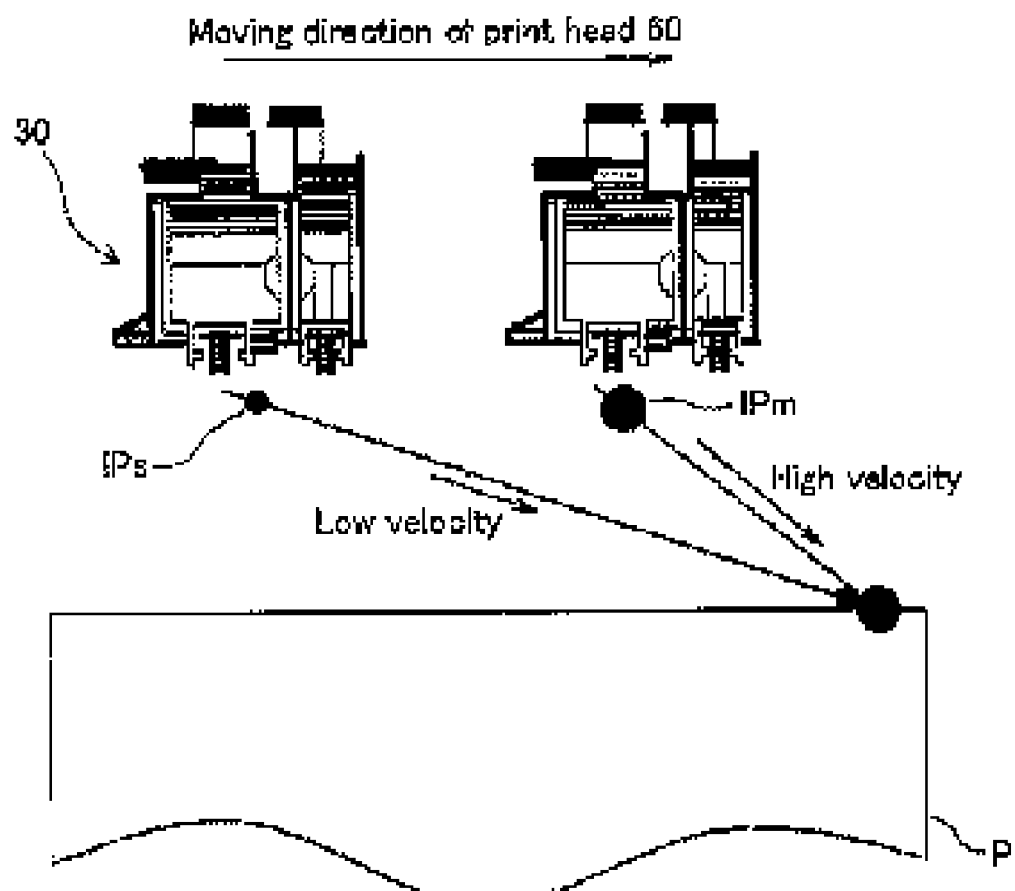
FIGS. 6A and 6B illustrate formation of large dots by the printing device of the embodiment.
Figure 6B:
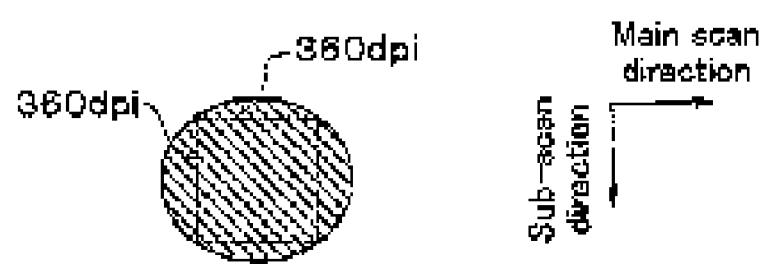

FIGS. 6A and 6B illustrate the process of formation of a large dot by the printing device of the present embodiment. FIG. 6A depicts a small dot ink drop IPs and a medium dot ink drop IPm as the two travel to the paper P after being ejected from nozzles. Typically, a medium dot ink drop IPm tends to be ejected more forcefully than a small dot ink drop IPs, and the relatively large ink drop is less likely to decelerate through air resistance. In the printer 20 of this embodiment, this tendency is utilized to produce a small and large dot at substantially the same location. However, as there is a certain amount of error in placement location of ink drop IPs and ink drop IPm, and since furthermore ink drops IPs and IPm are deposited on the print medium with a certain velocity in the main scan direction, the resultant dot has greater length in the main scan direction than in the sub-scan direction, as shown in FIG. 6B.

A color printer 20 having the hardware configuration described above reciprocates the carriage 30 by means of the carriage motor 24 while advancing the paper P by means of the paper feed motor 22, while at the same time driving the print head 28 and piezo elements to eject ink drops of each color, producing ink dots to form a multilevel color image on paper P.

B. The First Embodiment

Figure 7:
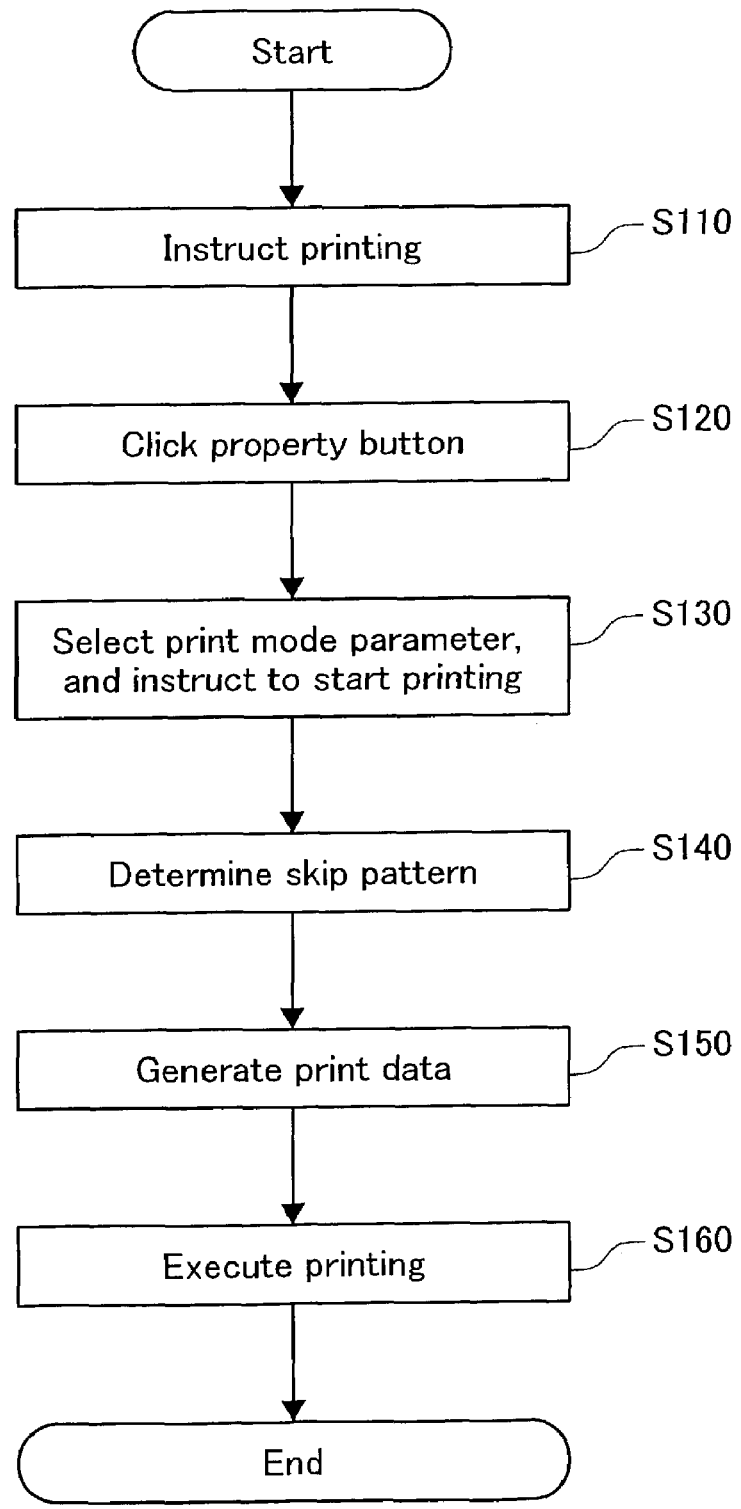
FIG. 7 is a flow chart depicting the printing process in the first embodiment of the present invention.
Figure 8:
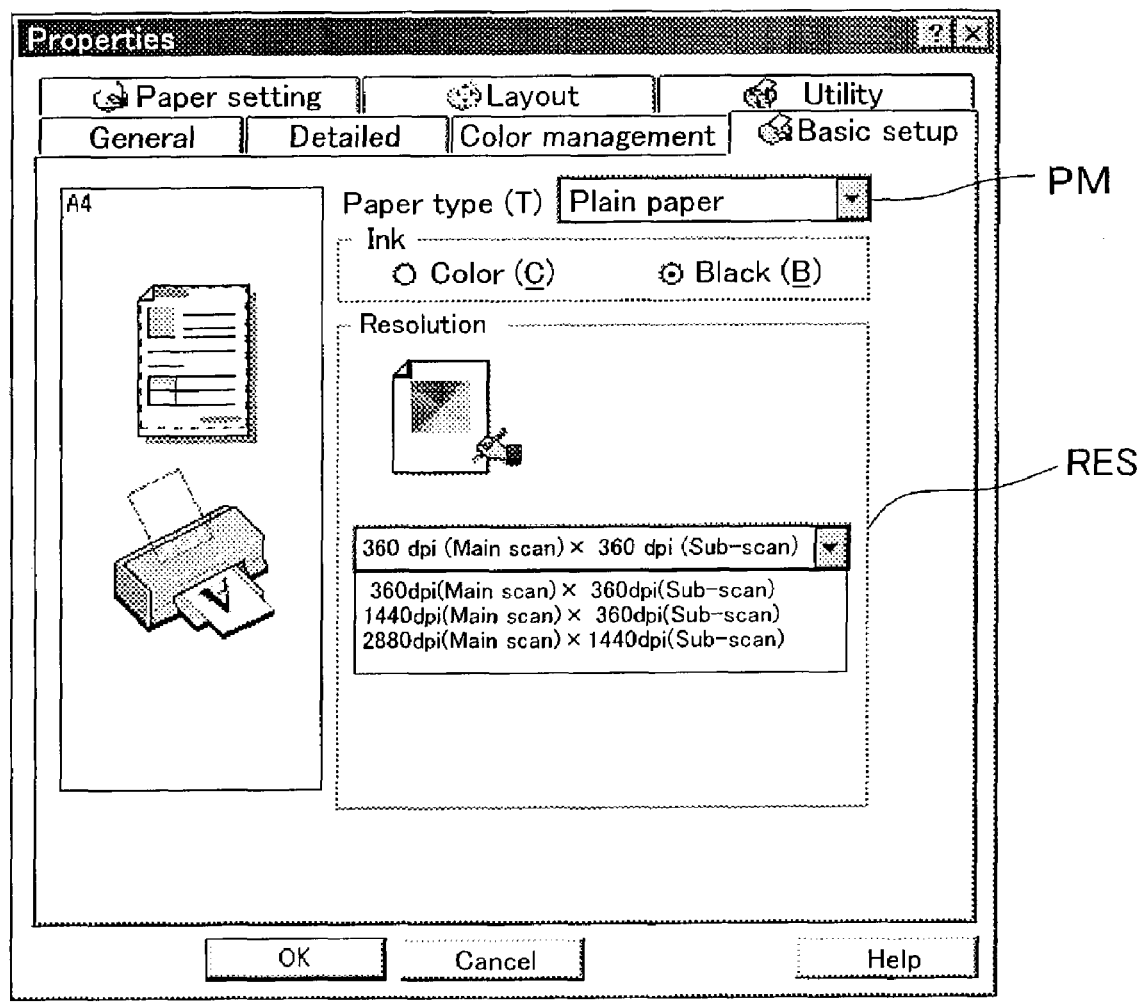
FIG. 8 shows an exemplary print mode Basic Settings screen displayed on CRT 21.

FIG. 7 is a flow chart depicting the printing process in the first embodiment of the present invention. FIG. 8 shows an exemplary print mode Basic Settings screen displayed on CRT 21. In this printing process, dot skipping method is determined with reference to printing mode parameters.

In Step S110, the user instructs the computer 90 to print. In Step S120, when the Properties button (not shown) which appears in the Print dialog box displayed on CRT 21 is clicked, the print mode selector 103 (FIG. 1) brings up the Properties settings screen shown in FIG. 8.

From the Properties settings screen the user may set various parameters for the print mode. The print mode Basic Settings screen shown in FIG. 8 includes the following elements allowing various parameters to be set.
(1) Paper Type menu PM: Pull-down menu for selecting either plain paper or special paper.
(2) Print Resolution setting switch RES: Pull-down menu for selecting combinations of resolution in the main scan and sub-scan directions.

From the Advanced settings screen, the user may set other additional parameters; however, these other parameters will not be discussed here.

In Step S130 in FIG. 7, the user sets the various parameters for print mode and instructs printing to begin, whereupon in Step S140 the print mode selector 103 sends information representing the print mode parameter settings to the skip pattern selector 104. In response to the information sent to it, the skip pattern selector 104 selects from among a plurality of predetermined printing patterns a skip pattern for use in printing.

FIG. 9 and FIGS. 10A-10C illustrate relation of print mode parameters and selected skip pattern in the first embodiment of the present invention. In this example, of the various parameters that define print mode, skip pattern is selected with specific reference to type of print media and print resolution.

In this example, the available options for print medium are plain paper and special paper. Three print resolution choices are available: 360 dpi×360 dpi (main scan direction×sub-scan direction), 1440 dpi×360 dpi and 2880 dpi× 1440 dpi. Where special paper is selected as the print medium type, a skipping process is not performed, regardless of other print mode parameters. The reason is that special paper absorbs ink rapidly, so that there is no bleeding even without a skipping process. Conversely, where plain paper is selected as the print medium type, a pattern for use in the skipping process is selected from among the predetermined skip patterns shown in FIGS. 10A-10C.

Figures 10A, 10B, 10C:
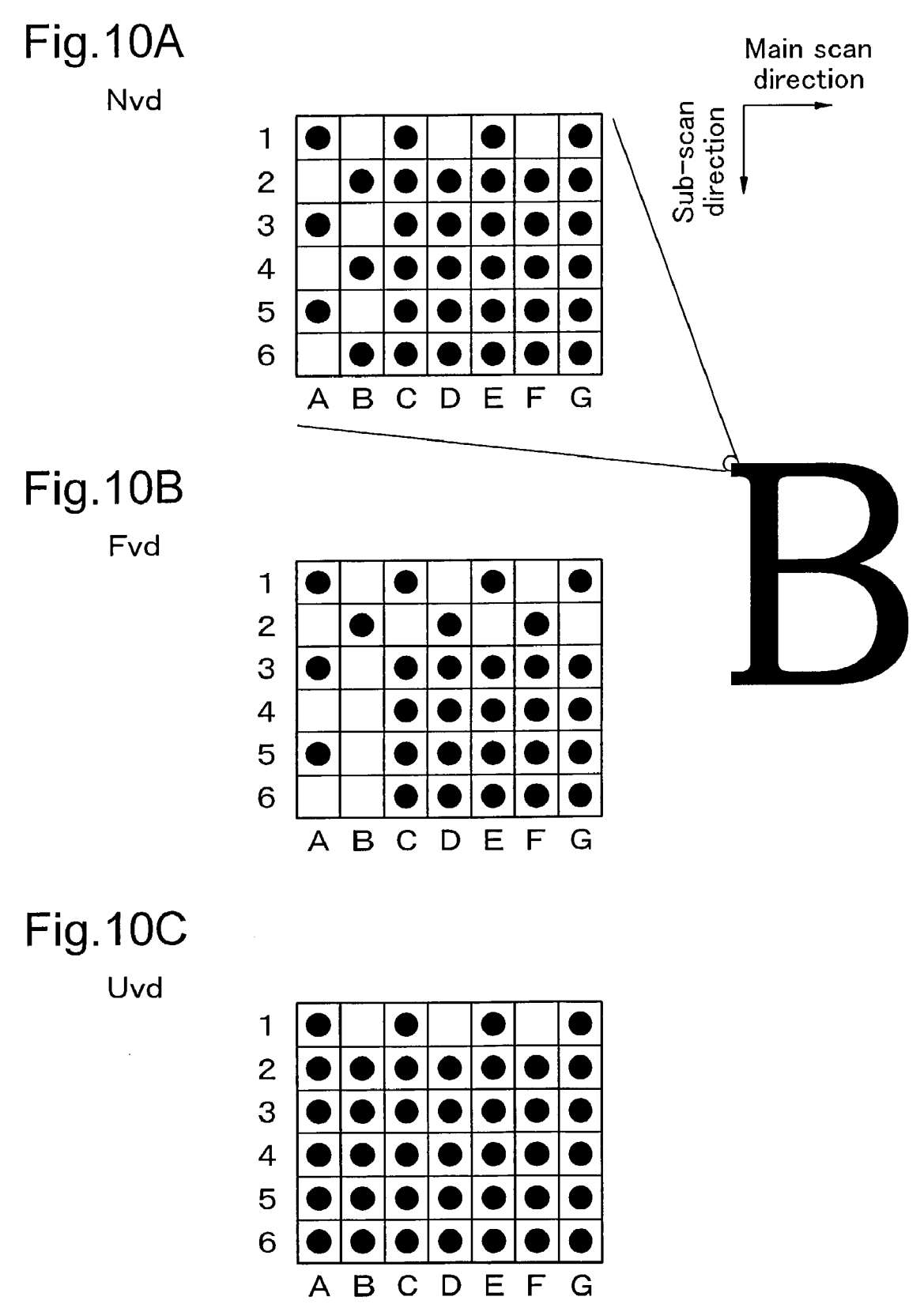

Where, for example, print medium type is set to plain paper and print resolution to 360 dpi×360 dpi as shown in FIG. 9, skip pattern Nvd shown in FIG. 10A is selected. Similarly, setting print resolution to 1440 dpi×360 dpi will result in skip pattern Fvd shown in FIG. 10B being selected, and setting print resolution to 2880 dpi×1440 dpi will result in skip pattern Uvd shown in FIG. 10C being selected. These skip patterns Nvd, Fvd, Uvd have been established through trial and error on the basis of actual printing in each of the associated print modes, with a view to preventing white spaces and bleeding so as to reproduce crisp borders.

The initial upper case letter in the skip pattern symbol indicates the associated print resolution, while the first lower case subscript denotes the associated dot-forming method, and the final lower case subscript denotes the type of ink. Specifically, the initial upper case letter "N" indicates a pattern associated with print resolution of 360 dpi×360 dpi, the initial upper case letter "F" one associated with print resolution of 1440 dpi×360 dpi, and the initial upper case letter "U" one associated with print resolution of 2880 dpi× 1440 dpi, respectively. The first lower case letter subscript "v" indicates one associated with the variable shot described earlier, and the final lower case letter subscript "d" indicates one associated with dye ink.

Figures 11A, 11B:
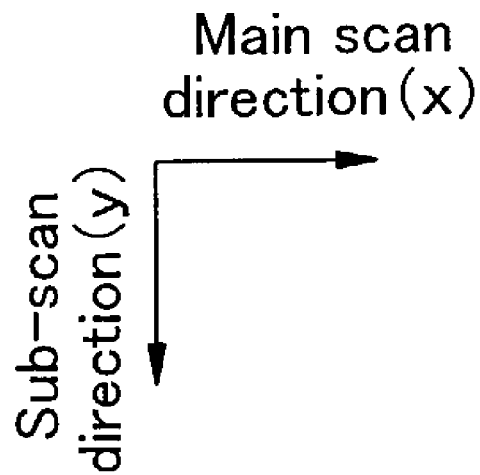
FIGS. 11A and 11B show filters used for extracting border lines in the first embodiment of the present invention.

FIGS. 11A and 11B give filters used for extracting border lines in the first embodiment of the present invention. FIG. 11A is a border line extraction filter for extracting border lines parallel to the sub-scan direction. FIG. 11B is a border line extraction filter for extracting border lines parallel to the main scan direction. In the present embodiment, border line extraction is performed for an area in which large dots are formed contiguously. Medium and small dots do not readily bleed ink even when formed contiguously. This "area in which large dots are formed contiguously" corresponds to the "specific type image area being composed of pixels at which specific type dots are to be formed" recited in the claims, and the extracted border lines and surrounding pixels correspond to the "border area" recited in the claims.

Dot skipping is performed using border lines extracted using these border line extraction filters. For example, where skip pattern Nvd has been selected, skipping is performed for the following lines, using these border line extraction filters.
(1) The border line parallel to the main scan direction (row 1 dot group in FIG. 10A)
(2) The border line parallel to the sub-scan direction (column A dot group in FIG. 10A)

(3) The line contiguous with the border line parallel to the sub-scan direction (column B dot group in FIG. 10A)

A specific skipping process proceeds as follows. For the border line parallel to the main scan direction, the even-numbered dots proceeding from the left are selectively omitted. For the border line parallel to the sub-scan direction, the even-numbered dots proceeding from the top are selectively omitted. For the line contiguous with the border line parallel to the sub-scan direction, the odd-numbered dots proceeding from the top are selectively omitted. This skipping process (skip pattern) gives a skip pattern like that shown in FIG. 10A. Selection of skip pattern in Step S140 actually refers to selection of skipping process (skip pattern) in the above manner.

The skipping process selected in this manner is used for the entire print job.

In Step S150, the print data generator 100 generates print data associated with the dot data processed by the skipping process selected in Step S140. In Step S160, the printer 20 prints out the print data supplied by computer 90.

In this manner, in the first embodiment a skipping process for use in actual printing is selected with reference to the two print mode parameters of print media type and print resolution. This allows the skipping process to be carried out with reference to the printing environment in such a way as to minimize bleed and white spaces, enabling bleed to be reduced in various printing environments having varying types of print media and print resolution.

C. The Second Embodiment

FIG. 12 and FIGS. 13A-13C illustrate relationships of print mode parameters and selected skip pattern in the second embodiment of the present invention. FIG. 12 differs from the table for the first embodiment shown in FIG. 9 in that dot-forming method is included as an additional print mode parameter. The second embodiment, in contrast to the first embodiment which can use only variable shot as the dot-forming method, can also use a multi-shot method, described later.

As will be apparent from FIG. 12, in the present embodiment as compared to that in FIG. 9, multi-shot is additionally available as a dot-forming method option. As a result, whereas in the first embodiment one of the patterns shown in FIG. 10 is selected once the type of print medium and the print resolution have been determined, in the present embodiment, the selected skip pattern will also differ according to the dot-forming method. Specifically, where the dot-forming method is variable shot, one of the patterns shown in FIG. 10 will be selected, but where it is variable shot, one of the patterns shown in FIG. 13 will be selected. The initial lower case letter subscript "m" in symbols denoting patterns in FIG. 13 indicates association with multi-shot dot-forming.

Figure 14H:
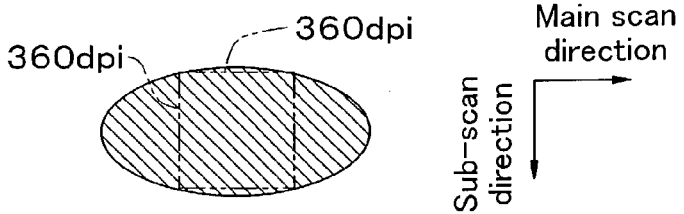

FIGS. 14A-14H illustrate a method for generating a drive signal DRV used by the head drive circuit 52 to form dots in multi-shot format. As shown in FIG. 14A, the original drive signal ORGDRV in the present embodiment contains pulses W3 of substantially identical waveform in each of three sub-intervals of a single pixel interval.

FIGS. 14B-14D show serial print signals PRT(i) for producing a small dot, a medium dot and a large dot, respectively. The small dot serial print signal (FIG. 14B) is "H" during the second sub-interval. The medium dot serial print signal (FIG. 14C) is "H" during the second and third sub-intervals. The large dot serial print signal (FIG. 14D) is "H" during all sub-intervals. As a result, the small dot drive signal (FIG. 14E) contains second pulse W3. The medium dot drive signal (FIG. 14F) contains second and third pulses W3. The large dot drive signal (FIG. 14G) contains three pulses, i.e. first to third pulses W3.

When drive signals DRV(i) as shown in FIGS. 14E-14F are supplied to piezo elements PE (FIG. 4), a single ink drop is ejected to produce a small dot, two ink drops to produce a medium dot, or three ink drops to produce a large dot. With this dot-forming method, a large dot is formed by three ink drops traveling at substantially equal velocity, so the dot will have greater length in the main scan direction than under the scenario illustrated in FIG. 6B, as will be apparent from FIG. 14H. This method of forming dots of different size using drive signals of substantially identical waveform is herein referred to as multi-shot.

The skip patterns shown in FIG. 13 have a greater skipping rate in the main scan direction than do those shown in FIG. 10. For example, in the skip pattern shown in FIG. 10A, one of every two dots in the first row is selectively omitted, whereas in the skip pattern shown in FIG. 13A three of every four dots is selectively omitted. The reason for this pattern is that multi-shot produces dots have extended length in the main scan direction as noted earlier, resulting in greater susceptibility to bleeding and less susceptibility to white spaces in border lines parallel to the main scan direction.

Modifying the skip pattern according to the dot-forming method in as in the present embodiment has the advantage of providing a printing environment-appropriate skipping process that largely prevents bleed and white spaces, even in multiple printing environments that allow the user to select the dot-forming method.

D. The Third Embodiment

FIG. 15 and FIGS. 16A-16D illustrate relation of print mode parameters and selected skip pattern in the third embodiment of the present invention. FIG. 15 differs from the table for the second embodiment shown in FIG. 12 in that ink type is included as an additional print mode parameter. The present embodiment, in contrast to the second embodiment which can use only dye inks as the ink type, can also use pigment inks.

FIG. 15 is a table similar to FIG. 12 but with pigment ink additionally available as an ink type option. As a result, whereas in the second embodiment one of the patterns shown in FIG. 10 or FIG. 13 is selected once the type of print medium, print resolution and dot-forming method have been determined, in the present embodiment, the selected skip pattern will also differ according to selected ink type. Specifically, where ink type is dye ink, one of the patterns shown in FIG. 10 or FIG. 13 will be selected, whereas in the case of pigment ink one of the patterns shown in FIGS. 16A-16D will be selected. The final lower case letter subscript "p" in symbols denoting skip patterns in FIGS. 16A-16D indicates association with pigment inks.

"Pigment ink" refers to ink containing pigment as the coloring matter, and "dye ink" to ink containing dye as the coloring matter. Dye ink tends to spread readily over a print medium, whereas pigment ink resists spreading over a print medium. Thus, for drops containing substantially equal amounts of ink ejected onto a print medium, the size of the dots formed on the print medium will differ. More specifically, a dot formed with pigment ink will tend to be smaller than a dot formed with dye ink. As a result, where pigment ink is used there will be a greater tendency for white spaces to occur than is the case when dye ink is used. It will therefore be apparent that when pigment ink is used for printing, the skipping rate will preferably be lower than with printing using dye ink.

Figures 16A, 16B, 16C, 16D:
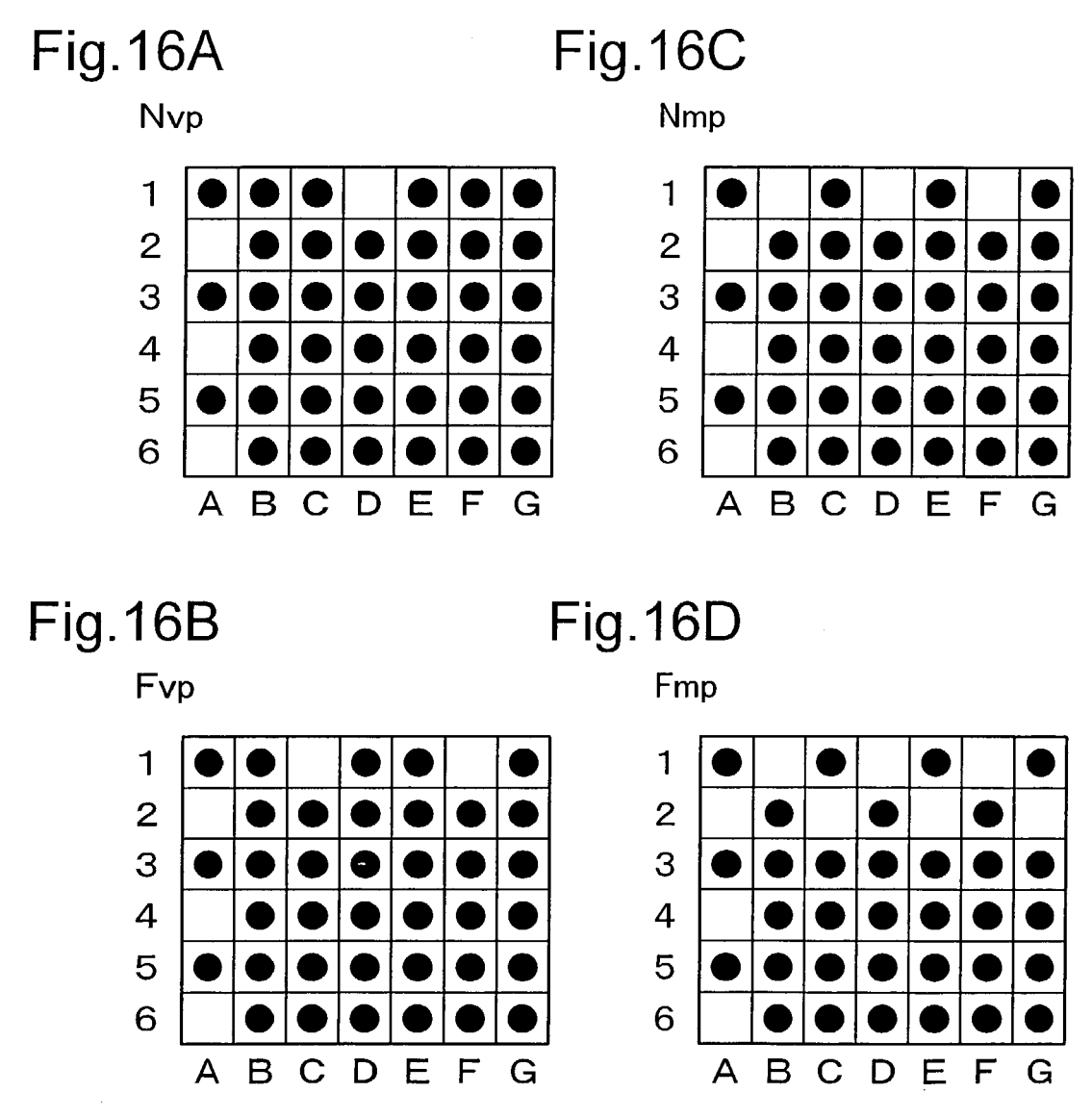

As shown in FIG. 16, skip patterns for use with pigment ink have lower skipping rates than the skip patterns illustrated in FIGS. 10 and 13. For example, comparison of skip pattern Nmp in FIG. 16C with skip pattern Nmd in FIG. 13A will show that the skip pattern for use with pigment ink has a lower dot skipping rate. Skip pattern Nmp and skip pattern Nmd are otherwise identical environments in terms of type of print medium, print resolution and dot-forming method.

The present embodiment allows skip pattern to be modified depending on ink type in this manner, and therefore provides the advantage of providing a printing environment-appropriate skipping process that largely prevents bleed and white spaces, even in multiple printing environments that allow the user to select ink type.

E. Modifications

While the invention has been shown and described herein with reference to certain examples and embodiments, it is not limited thereto, and may be reduced to practice in various modes without departing from the scope and spirit thereof. For example, variations such as the following are possible.

E-1. In the preceding embodiments, ink outflow is controlled by skipping dots, but could instead be accomplished by dot size reduction, combining dot skipping with different dot sizes, or other method for reducing the amount of ink; generally, any method that controls ink outflow by reducing the amount of ink will be acceptable. For example, dot skipping or forming of smaller dots may be performed selectively according to dot position in a specific area of the image, i.e. a line drawing area; where a variable dot size method is used, a resultant advantage is that bleeding in border lines can be controlled more finely according to print resolution or other printing environment.

E-2. In the preceding embodiments, the dots are skipped by extracting border areas composed of large dots, but a process of reducing the amount of ink could also be performed in a font process for printed images that are rendered by a font process, such as text.

Where a font process employs bit-mapped fonts for example, specific bit-mapped fonts can pre-designed using a process of reducing the amount of ink depending on the print mode, and a particular bit-mapped font selected for use depending on the particular print mode. Where data defining border lines is used for printing, as with outline fonts, the process of reducing the amount of ink may be carried out on the basis of border line data generated from the outline font, and with reference to the particular print mode.

E-3. In the preceding embodiments, border lines are defined as boundaries with areas in which no ink dots are formed. However, border lines are not limited to this definition, and may consist generally of any discontinuity in values characterizing a particular in area. For example, border lines may demarcate boundaries between different colors, as the invention is effective in reducing bleed at such borders, and bleed occurring at such borders degrades image quality. In such cases it will be desirable to modify ink dot skipping and ink dot size in at least one of these areas.

E-4. In the preceding embodiments, the print mode parameters used to determine the specifics of the skipping process are the three parameters of type of print medium, print resolution, type of ink coloring matter, and dot-forming method, but the specifics of the skipping process could also be determined on the basis of type of ink solvent, namely super penetration ink or low permeation ink, for example. Generally, the specifics of the skipping process may be determined with reference to the print mode parameter that effects bleed in border lines.

The terms "super penetration ink" and "low permeation ink" herein refer to the relative characteristics of these inks. When equal amounts of the two are dripped onto a standard print medium (plain paper, for example), super penetration ink will penetrate into the print medium more rapidly than does the low permeation ink. As a super penetration ink one may use an ink having surface tension of less than about 40×10−3 N/m at about 20° C., for example. As a low penetration ink one may use an ink having surface tension in excess of about 40×10−3 N/m at about 20° C., for example. Either dyes or pigments may be used as coloring matter in super penetration inks and low penetration inks.

In the preceding embodiments, the type of print medium is specified through selection of the print mode, but could instead be specified by providing the printing device with means for automatically identifying the type of print medium. Generally, any arrangement whereby the ink amount reduction method is determined with reference to print mode selected from a plurality of print modes useable by a printing device will be satisfactory.

Means for automatically identifying the type of print medium could include, for example, optical specifying means for identifying special paper and plain paper by differentiating reflected light based on their different light reflectance; bar code reading means for identifying a print medium by reading a bar code pre-printed on the recording medium or packaging; or means using an IC reader for identification. Such means have the advantage that the user does not need to perform a process for specifying the print medium, whereas means by which print medium is specified through selection of the print mode have the advantage of simplicity of design.

E-6. In the preceding embodiments, halftone data is processed to extract border lines, and this is used in the process for reducing the amount of ink. However, the method for extracting border lines is not limited to this method. Where data defining border lines is used for printing, as with outline fonts, border line data generated from the outline data may be used directly to perform the process for reducing the amount of ink. That is, the present invention is applicable generally to techniques in which bleed in border lines is controlled by processing dot data that indicates dot formation status.

E-7. The invention is applicable not only to color printing but to monochrome printing as well. It is also applicable to multilevel printing in which single pixels are represented by a plurality of dots. It is applicable to drum printers as well. In a drum printer, the direction of drum rotation is the main scan direction, and the direction of carriage travel is the sub-scan direction. The invention is applicable not just to ink-jet printers, but generally to all manner of ink dot recording devices that record onto the surface of a print medium using a recording head equipped with a plurality of nozzle rows.

E-8. In the preceding embodiments, some of the arrangements realized through hardware may instead by substituted by software, and conversely some of the arrangements realized through software may instead by substituted by hardware. For example, some or all of the functions of the printer driver 96 shown in FIG. 1 could be performed by the control circuit 40 in the printer 20. In this case, some or all of the functions of the printing device that creates the print data, namely, computer 90, would instead by performed by the control circuit 40 in the printer 20.

Where some or all of the functions of the present invention are realized through software, the software (computer program) can be provided in a form stored on a computer-readable recording medium. In this invention, "computer-readable recording media" are not limited to portable recording media such as a floppy disks or CD-ROMs, but include also various kinds of RAM, ROM and other computer internal storage devices, as well as hard disks and other external storage devices fixed to the computer.

What is claimed is:

1. A method of recording an image by forming ink dots on a print medium in one of a plurality of print modes, comprising the steps of
   (a) generating dot data from image data indicative of the image, the dot data representing a state of dot formation at each pixel on the print medium;
   (b) determining a reduction pattern in response to a print mode selected from the plurality of print modes, the reduction pattern representing reduction of an amount of ink for forming an ink dot on a border area of a specific type image area represented by the dot data, the specific type image area being composed of pixels at which specific type dots are to be formed;
   (c) adjusting the dot data so as to reduce the amount of ink for forming the ink dots based on the selected reduction pattern; and
   (d) recording the image on the print medium by forming the ink dots in response to the adjusted dot data, wherein
   the plurality of print modes includes a variable shot mode by forming dots of different size with drive signals of different waveforms and a multi-shot mode by forming dots of different size with drive signals of substantially identical waveform, wherein
   the determining includes determining a reduction pattern having a greater reduction rate in a main scan direction for the multi-shot mode than a reduction rate in a main scan direction of a reduction pattern for the variable shot mode.

2. The method in accordance with claim 1, further comprising the step of providing a user interface to allow a user to select one from the plurality of print modes, wherein
   the step (b) includes the step of determining the reduction pattern in response to the user selection on the user interface.

3. The method in accordance with claim 1, wherein
   the plurality of print modes are defined by at least one print mode parameter including a type of the print medium, and
   the step (b) includes the step of determining the reduction pattern in response to the selected type of the print medium.

4. The method in accordance with claim 1, wherein
   the plurality of print modes are defined by at least one print mode parameter including a print resolution, and
   the step (b) includes the step of determining the reduction pattern in 5 response to the selected print resolution.

5. The method in accordance with claim 1, wherein
   the plurality of print modes are defined by at least one print mode parameter including a type of dot forming method, and
   the step (b) includes the step of determining the reduction pattern in response to the selected type of dot forming method.

6. The method in accordance with claim 1, wherein
   the plurality of print modes are defined by at least one print mode 15 parameter including a type of ink, and
   the step (b) includes the step of determining the reduction pattern in response to the selected type of ink.

7. The method in accordance with claim 1, wherein
   the step(c) includes the step of performing dot skipping, to thereby adjust the dot data so as to reduce the amount of ink.

8. The method in accordance with claim 1, wherein the step(c) includes the step of performing dot size reduction, to thereby adjust the dot data so as to reduce the amount of ink.

9. The method in accordance with claim 1, wherein the step(c) includes the step of selectively performing one of dot skipping and dot size reduction, to thereby adjust the dot data so as to reduce the amount of ink, the selection of the dot skipping and the dot size reduction depending on a pixel position of each dot within the specific image area.

10. A printing apparatus for recording an image by forming ink dots 5 on a print medium in one of a plurality of print modes, the printing apparatus comprising:
    a dot data generator configured to generate dot data from image data indicative of the image, the dot data representing a state of dot formation at each pixel on the print medium;
    a reduction pattern determiner configured to determine a reduction pattern in response to a print mode selected from the plurality of print modes, the reduction pattern representing reduction of an amount of ink for forming an ink dot on a border area of a specific type image area represented by the dot data, the specific type image area being composed of pixels at which specific type dots are to be formed;
    a dot data adjuster configured to adjust the dot data so as to reduce the amount of ink for forming the ink dots based on the selected reduction pattern;
    a print data generator configured to generate the print data in response to the adjusted dot data; and
    a print unit configured to record the image on the print medium by forming the ink dots in response to the adjusted dot data, wherein
    the plurality of print modes includes a variable shot mode by forming dots of different size with drive signals of different waveforms and a multi-shot mode by forming dots of different size with drive signals of substantially identical waveform, wherein
    the determining includes determining a reduction pattern having a greater reduction rate in a main scan direction for the multi-shot mode than a reduction rate in a main scan direction of a reduction pattern for the variable shot mode.

11. The printing apparatus in accordance with claim 10, further comprising a user interface to provide a user interface to allow a user to select one from the plurality of print modes, wherein
    the reduction pattern determiner is configured to determine the reduction pattern in response to the user selection on the user interface.

12. The printing apparatus in accordance with claim 10, wherein
    the plurality of print modes are defined by at least one print mode parameter including a type of the print medium, and
    the reduction pattern determiner is configured to determine the 5 reduction pattern in response to the selected type of the print medium.

13. The printing apparatus in accordance with claim 10, wherein
the plurality of print modes are defined by at least one print mode parameter including a print resolution, and
the reduction pattern determiner is configured to determine the reduction pattern in response to the selected print resolution.

14. The printing apparatus in accordance with claim 10, wherein
the plurality of print modes are defined by at least one print mode parameter including a type of dot-forming method, and
the reduction pattern determiner is configured to determine the reduction pattern in response to the selected type of dot-forming method.

15. The printing apparatus in accordance with claim 10, wherein
the plurality of print modes are defined by at least one print mode parameter including a type of ink, and
the reduction pattern determiner is configured to determine the reduction pattern in response to the selected type of ink.

16. The printing apparatus in accordance with claim 10, wherein
the dot data adjuster is configured to perform dot skipping, to thereby adjust the dot data so as to reduce the amount of ink.

17. The printing apparatus in accordance with claim 10, wherein
the dot data adjuster is configured to perform dot size reduction, to thereby adjust the dot data so as to reduce the amount of ink.

18. The printing apparatus in accordance with claim 10, wherein
the dot data adjuster is configured to selectively perform one of dot skipping and dot size reduction, to thereby adjust the dot data so as to reduce the amount of ink, the selection of the dot skipping and the dot size reduction depending on a pixel position of each dot within the specific image area.

19. A method of generating print data to be supplied to a print unit to record an image by forming ink dots on a print medium in one of a plurality of print modes, comprising the steps of,
(a) generating dot data from image data indicative of the image, the dot data representing a state of dot formation at each pixel on the print medium;
(b) determining a reduction pattern in response to a print mode selected from the plurality of print modes, the reduction pattern representing reduction of an amount of ink for forming an ink dot on a border area of a specific type image area represented by the dot data, the specific type image area being composed of pixels at which specific type dots are to be formed;
(c) adjusting the dot data so as to reduce the amount of ink for forming the ink dots based on the selected reduction pattern; and
(d) generating the print data in response to the adjusted dot data, wherein
the plurality of print modes includes a variable shot mode by forming dots of different size with drive signals of different waveforms and a multi-shot mode by forming dots of different size with drive signals of substantially identical waveform, wherein
the determining includes determining a reduction pattern having a greater reduction rate in a main scan direction for the multi-shot mode than a reduction rate in a main scan direction of a reduction pattern for the variable shot mode.

20. The method in accordance with claim 19, further comprising the step of providing a user interface to allow a user to select one from the plurality of print modes, wherein
the step (b) includes the step of determining the reduction pattern in response to the user selection on the user interface.

21. The method in accordance with claim 19, wherein the plurality of print modes are defined by at least one print mode parameter including a type of the print medium, and
the step (b) includes the step of determining the reduction pattern in response to the selected type of the print medium.

22. The method in accordance with claim 19, wherein
the plurality of print modes are defined by at least one print mode parameter including a print resolution, and
the step (b) includes the step of determining the reduction pattern in response to the selected print resolution.

23. The method in accordance with claim 19, wherein
the plurality of print modes are defined by at least one print mode parameter including a type of dot-forming method, and
the step (b) includes the step of determining the reduction pattern in response to the selected type of dot-forming method.

24. The method in accordance with claim 19, wherein
the plurality of print modes are defined by at least one print mode parameter including a type of ink, and
the step (b) includes the step of determining the reduction pattern in response to the selected type of ink.

25. The method in accordance with claim 19, wherein
the step(c) includes the step of performing dot skipping, to thereby adjust the dot data so as to reduce the amount of ink.

26. The method in accordance with claim 19, wherein
the step(c) includes the step of performing dot size reduction, to thereby adjust the dot data so as to reduce the amount of ink.

27. The method in accordance with claim 19, wherein
the step(c) includes the step of selectively performing one of dot skipping and dot size reduction, to thereby adjust the dot data so as to reduce the amount of ink, the selection of the dot skipping and the dot size reduction depending on a pixel position of each dot within the specific image area.

28. A printing control apparatus for generating print data to be supplied to a print unit to record an image by forming ink dots on a print medium in one of a plurality of print modes, the printing control apparatus comprising:
a dot data generator configured to generate dot data from image data indicative of the image, the dot data representing a state of dot formation at each pixel on the print medium;
a reduction pattern determiner configured to determine a reduction pattern in response to a print mode selected from the plurality of print modes, the reduction pattern representing reduction of an amount of ink for forming an ink dot on a border area of a specific type image area represented by the dot data, the specific type image area being composed of pixels at which specific type dots are to be formed;
a dot data adjuster configured to adjust the dot data so as to reduce the amount of ink for forming the ink dots based on the selected reduction pattern; and a print data generator configured to generate the print data in response to the adjusted dot data, wherein the plurality of print modes includes a variable shot mode by forming dots of different size with drive signals of different waveforms and a multi-shot mode by forming dots of different size with drive signals of substantially identical waveform, wherein the determining includes determining a reduction pattern having a greater reduction rate in a main scan direction for the multi-shot mode than a reduction rate in a main scan direction of a reduction pattern for the variable shot mode.

29. The printing control apparatus in accordance with claim 28, flirt her comprising a user interface to provide a user interface to allow a user to select one from the plurality of print modes, wherein the reduction pattern determiner is configured to determine the reduction pattern In response to the user selection on the user interface.

30. The printing control apparatus in accordance with claim 28, wherein the plurality of print modes are defined by at least one print mode parameter including a type of the print medium, and the reduction pattern determiner is configured to determine the reduction pattern in response to the selected type of the print medium.

31. The printing control apparatus in accordance with claim 28, wherein the plurality of print modes are defined by at least one print mode parameter including a print resolution, and the reduction pattern determiner is configured to determine the reduction pattern in response to the selected print resolution.

32. The printing control apparatus in accordance with claim 28, wherein the plurality of print modes are defined by at least one print mode parameter including a type of dot-forming method, and the reduction pattern determiner is configured to determine the reduction pattern in response to the selected type of dot-forming method.

33. The printing control apparatus in accordance with claim 28, wherein the plurality of print modes are defined by at least one print mode parameter including a type of ink, and the reduction pattern determiner is configured to determine the reduction pattern in response to the selected type of ink.

34. The printing control apparatus in accordance with claim 28, wherein the dot data adjuster is configured to perform dot skipping, to thereby adjust the dot data so as to reduce the amount of ink.

35. The printing control apparatus in accordance with claim 28, wherein the dot data adjuster is configured to perform dot size reduction, to thereby adjust the dot data so as to reduce the amount of ink.

36. The printing control apparatus in accordance with claim 28, wherein the dot data adjuster is configured to selectively perform one of dot skipping and dot size reduction to thereby adjust the dot data so as to reduce the amount of ink, the selection of the dot skipping and the dot size reduction depending on a pixel position of each dot within the specific image area.

37. A computer program product for causing a computer to generate print data to be supplied to a print unit to record an image by forming ink dots on a print medium in one of a plurality of print modes, the computer program product comprising:

a computer readable medium; and a computer program stored on the computer readable medium, the computer program comprising a first program for causing the computer to generate dot data from image data indicative of the image, the dot data representing a state of dot formation at each pixel on the print medium;

a second program for causing the computer to determine a reduction pattern in response to a print mode selected from the plurality of print modes, the reduction pattern representing reduction of an amount of ink for forming an ink dot on a border area of a specific type image area represented by the dot data, the specific type image area being composed of pixels at which specific type dots are to be formed;

a third program for causing the computer to adjust the dot data so as to reduce the amount of ink for forming the ink dots based on the selected reduction pattern; and a fourth program for causing the computer to generate the print data in response to the adjusted dot data, wherein the plurality of print modes includes a variable shot mode by forming dots of different size with drive signals of different waveforms and a multi-shot mode by forming dots of different size with drive signals of substantially identical waveform, wherein the determining includes determining a reduction pattern having a greater reduction rate in a main scan direction for the multi-shot mode than a reduction rate in a main scan direction of a reduction pattern for the variable shot mode.

38. The computer program product in accordance with claim 37, further comprising a fifth program for causing the computer to provide a user interface to allow a user to select one from the plurality of print modes, wherein the second program comprises a program for causing the computer to determine the reduction pattern in response to the user selection on the user interface.

39. The computer program product in accordance with claim 37, wherein the plurality of print modes are defined by at least one print mode parameter including a type of the print medium, and the second program comprises a program for causing the computer to determine the reduction pattern in response to the selected type of the print medium.

40. The computer program product in accordance with claim 37, wherein the plurality of print modes are defined by at least one print mode parameter including a print resolution, and the second program comprises a program for causing the computer to determine the reduction pattern in response to the selected print resolution.

41. The computer program product in accordance with claim 37, wherein the plurality of print modes are defined by at least one print mode parameter including a type of dot-forming method, and the second program comprises a program for causing the computer to determine the reduction pattern in response to the selected type of dot-forming method.

42. The computer program product in accordance with claim 37, wherein
   the plurality of print modes are defined by at least one print mode parameter including a type of ink, and
   the second program comprises a program for causing the computer to determine the reduction pattern in response to the selected type of ink.

43. The computer program product in accordance with claim 37, wherein
   the third program comprises a program for causing the computer to perform dot skipping, to thereby adjust the dot data so as to reduce the amount of ink.

44. The computer program product in accordance with claim 37, wherein
   the third program comprises a program for causing the computer to perform dot size reduction, to thereby adjust the dot data so as to reduce the amount of ink.

45. The computer program product in accordance with claim 37, wherein
   the third program comprises a program for causing the computer to selectively perform one of dot skipping and dot size reduction, to thereby adjust the dot data so as to reduce the amount of ink, the selection of the dot skipping and the dot size reduction depending on a pixel position of each dot within the specific image area.

* * * * *